Aug. 23, 1960    W. KUNZER ET AL    2,950,180
CHEMICAL REACTOR TOWER
Filed March 19, 1958
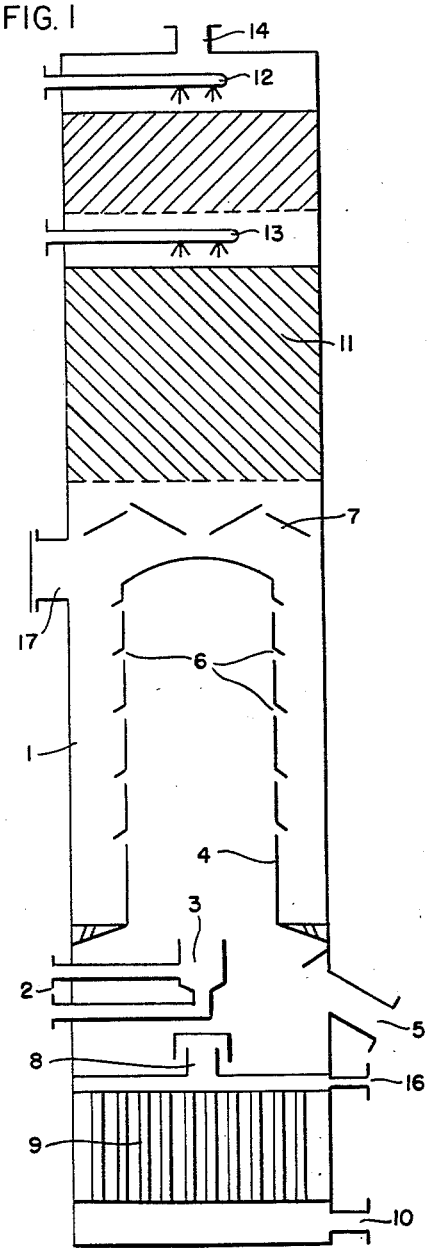
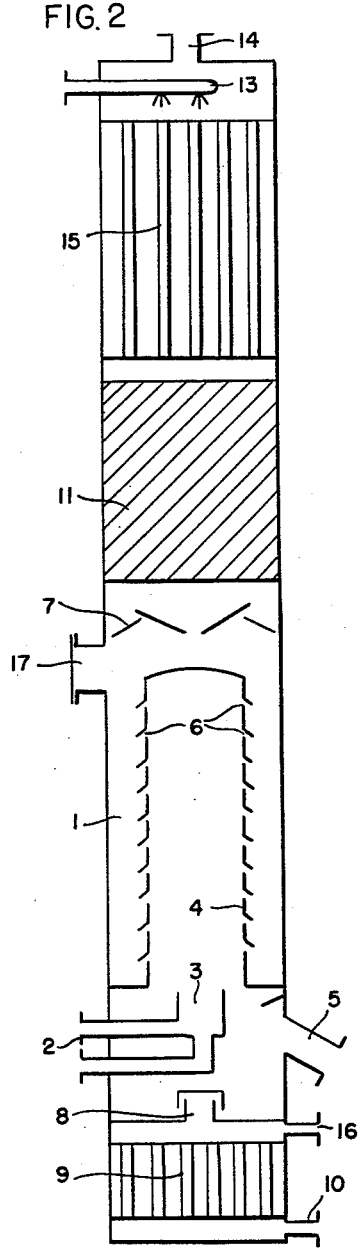
INVENTORS:
WERNER KUNZER
FRITZ LEUTERT
BY Marshall, Johnston, Cook & Root
ATT'YS United States Patent Office 2,950,180
Patented Aug. 23, 1960

2,950,180

CHEMICAL REACTOR TOWER

Werner Kunzer, Ludwigshafen (Rhine), and Fritz Leutert, Fussgoenheim, Germany, assignors to Badische Anilin- & Soda-Fabrik Aktiengesellschaft, Ludwigshafen (Rhine), Germany Filed Mar. 19, 1958, Ser. No. 722,523

Claims priority, application Germany Mar. 22, 1957

6 Claims. (Cl. 23—283)

This invention relates to an apparatus for the production of hydrogen chloride and for the absorption of the same by means of an aqueous absorption liquid or for the recovery of hydrogen chloride in cooled state.

It is known from British patent specification No. 740,252 to convert hydrogen chloride from gases into commercial hydrochloric acid with aqueous absorption liquids by carrying out the absorption in a tower provided with filler bodies and charged in the usual way at the top with the aqueous absorption liquid and traversed upwardly by the gases, there being provided, while avoiding intermediate pipes, a heat exchanger for the effluent hydrochloric acid immediately below the bottom of the absorption chamber and immediately above the absorption chamber a cooler for the condensation of the water vapor carried away with the gases and of other condensable constituents of the gases, the absorption tower being connected both to the heat exchanger and the cooler by a dip seal.

In the said apparatus it is possible to recover from gases which contain only a little hydrogen chloride, highly concentrated hydrogen chloride, the heat exchanger beneath the absorption chamber serving as a heating device to expel part of the hydrogen chloride from the hydrochloric acid entering said heat exchanger, the acid, of which the content of hydrogen chloride thereby falls to about 20 to 25%, being returned to the tower and concentrated again.

We have now found that the synthesis of hydrogen chloride from chlorine and hydrogen or carbohydrogen and its absorption to form hydrochloric acid or its direct recovery in cooled state can be carried out in a simple manner in a single tower which is charged in known manner at the top with aqueous absorption liquid and traversed upwards by the gases to be absorbed, by arranging in the tower, while avoiding intermediate pipes, above a heat exchanger which is adjacent the bottom of the tower, a burner chamber for the production of hydrogen chloride which is cooled by the hydrochloric acid flowing down from the absorption zone situated above the same.

Such an apparatus is shown diagrammatically and by way of example in Figure 1 of the accompanying drawings. Chlorine and hydrogen or carbohydrogen, supplied at 2, are introduced into a chamber 1 and burnt in a burner 3 beneath a bell 4 to form hydrogen chloride. Manipulation and observation of the burner take place through a pipe 5 in the wall of the burner chamber. The hydrogen chloride formed leaves the bell through openings 6 which are shielded like a jalousie from the liquid flowing down from the absorption chamber 11 above so that the liquid cannot penetrate into the combustion chamber and impair the combustion process or prematurely destroy the burner. Over the bell 4 there is arranged a distributor member 7 by means of which both the outer wall of the bell and the inner wall of the tower are uniformly wetted by the hydrochloric acid flowing down from the absorption chamber 11. By the evaporation of the hydrochloric acid which thereby takes place, a uniform cooling of the burner chamber and of the whole tower space in which the burner chamber is housed is effected. The hydrogen chloride formed in the burner chamber becomes saturated with water vapor which it extracts from the acid flowing down from the absorption chamber 11 so that hydrochloric acid with a content of 30 to 32% HCl and at a temperature of 80° to 90° C. passes through a dip seal 8 into a heat exchanger 9 at the bottom of the tower. It is cooled therein to the desired temperature and finally leaves the tower through a pipe 10.

The absorption chamber 11 situated above the part of the tower serving for the production of hydrogen chloride is provided in known manner with filler bodies and with a supply 12 through which water or dilute hydrochloric acid is introduced as absorption liquid. The waste gas and the water vapor produced by the heat of combustion and absorption leave the tower at the top through a pipe 14. The pipe 17 is provided for the reception of a safety device, for example a flap, which liberates the pressure in the event of the occurrence of explosions.

It has been found to be advantageous to provide the intermediate space between the bell 4 and the inner wall of the part of the tower serving for the production of hydrogen chloride with filler bodies. The distribution of the hydrochloric acid flowing down from the absorption chamber can be controlled by the choice of suitable filler bodies so that in this case the provision of a distributor member 7 can be dispensed with. This filling at the same time hinders the rapid propagation of explosions so that their effect is greatly moderated.

The apparatus according to this invention makes it possible to obtain hydrogen chloride gas with a content of 100% of HCl directly from hydrogen chloride prepared from the elements and contaminated with other gases. For this purpose the heat exchanger 9 is operated not as a cooler but as a heating device, so that a part of the hydrogen chloride is expelled from the hydrochloric acid entering the heat exchanger 9. The about 20 to 23% hydrochloric acid flowing out through the pipe 10 is continuously supplied again through pipe 13 to the absorption part of the tower and saturated with hydrogen chloride. The concentrated hydrogen chloride leaves the apparatus through a pipe 16 and is then freed in a cooler and a drier from the accompanying water vapor.

It is also possible, especially when the gases supplied to the burner chamber are pure or when the highest requirements as to the purity are not placed on the hydrogen chloride to be prepared, to operate the heat exchanger 9 as a cooler and to supply the concentrated cooled hydrochloric acid flowing out from the pipe 10 to the tower again at the top continuously through a pipe 13 so that this same amount of acid is always circulating in the system and the hydrogen chloride formed is cooled thereby before leaving the tower. When working in this way there is effected by a heat exchanger 15 provided at the top of the tower, such as is shown by way of example in Figure 2 of the accompanying drawings, the condensation of water vapor and hydrochloric acid so that the hydrogen chloride escapes through pipe 14 with only a small moisture content. This heat exchanger 15 also makes possible the recovery of the combustion and absorption heat in the form of hot water.

The arrangement according to this invention makes possible the use as building material for the apparatus of a mixture of graphite and resins which is very stable to hot hydrochloric acid and hydrogen chloride, without the risk of disturbances in operation by breakage damage having to be taken into account because intermediate pipes, which are known to be especially susceptible to the same are avoided in the arrangement. By the combination according to the invention of the synthesis of hydrogen chloride and its absorption to hydrochloric acid or its direct cooling by means of hydrochloric acid, the costs of the plant are also considerably diminished.

We claim:

1. In an apparatus for the recovery of hydrogen chloride wherein a single absorption tower is provided with an absorption zone intermediate of the tower, means to introduce an aqueous absorption liquid and means to remove effluent fluids located above said absorption zone in said tower, an indirect heat exchanger adjacent the bottom of said tower beneath said absorption zone, and means to withdraw hydrochloric acid from said tower below said heat exchanger, the improvement which comprises: a burner located within said tower between the absorption zone and said heat exchanger for the production of hydrogen chloride; means to introduce reactant gases to said burner; and a burner chamber positioned above said burner but below said absorption zone, said burner chamber having a closed top and side walls spaced inwardly from the inner walls of said tower, the side walls having openings for the passage of hydrogen chloride gas upwardly into said absorption zone.

2. In an apparatus for the recovery of hydrogen chloride wherein a single absorption tower is provided with an absorption zone intermediate of the tower, means to introduce an aqueous absorption liquid and means to remove effluent fluids located above said absorption zone in said tower, an indirect heat exchanger adjacent the bottom of said tower beneath said absorption zone, and means to withdraw hydrochloric acid from said tower below said heat exchanger, the improvement which comprises: a burner located within said tower at a spaced distance below said absorption zone but above said heat exchanger for the production of hydrogen chloride from reactant gases; means to introduce reactant gases to said burner; a burner chamber located within said tower between said burner and said absorption zone, said burner chamber having a closed top and side walls spaced inwardly from the inner walls of said tower, the side walls having openings for the passage of hydrogen chloride gas from said burner chamber upwardly into said absorption zone; and means to prevent hydrochloric acid flowing downwardly from said absorption zone from entering said burner chamber through said openings.

3. An improved apparatus as claimed in claim 2 wherein the burner chamber is provided with a plurality of openings in the said walls thereof, and a flange extends outwardly from said side walls over each of said openings to prevent hydrochloric acid from entering said burner chamber.

4. An improved apparatus as claimed in claim 2 having means to distribute hydrochloric acid flowing downwardly from said absorption zone uniformly around the outer surface of the side walls of said burner chamber.

5. An improved apparatus as claimed in claim 4 wherein said means for uniformly distributing hydrochloric acid around the outer surface of the side walls of said burner chamber include baffle plates located between said absorption zone and the top of said burner chamber to direct the flow of hydrochloric acid uniformly around said burner chamber.

6. An improved apparatus as claimed in claim 4 wherein said means for uniformly distributing hydrochloric acid around the outer surface of the side walls of said burner chamber include filler bodies occupying the intermediate space between the side walls of said burner chamber and the inner walls of said tower.

References Cited in the file of this patent

UNITED STATES PATENTS

| 1,687,229 | Riedel | Oct. 9, 1928 |
| 2,631,135 | Hotchkiss | Mar. 10, 1953 |

FOREIGN PATENTS

| 624,974 | Great Britain | June 20, 1949 |
| 740,242 | Great Britain | Nov. 9, 1955 |